United States Patent
Hutchison

(10) Patent No.: US 9,895,631 B2
(45) Date of Patent: Feb. 20, 2018

(54) COMPOSITION FOR USE IN OILS

(71) Applicant: PHILLIPS 66 COMPANY, Houston, TX (US)

(72) Inventor: Gregory Scott Hutchison, Broken Arrow, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 15/251,787

(22) Filed: Aug. 30, 2016

(65) Prior Publication Data

US 2017/0065907 A1    Mar. 9, 2017

Related U.S. Application Data

(60) Provisional application No. 62/213,730, filed on Sep. 3, 2015.

(51) Int. Cl.
*B01D 19/04* (2006.01)
*C08L 33/08* (2006.01)

(52) U.S. Cl.
CPC .......... *B01D 19/0404* (2013.01); *C08L 33/08* (2013.01)

(58) Field of Classification Search
CPC ..................................... B01D 19/04
See application file for complete search history.

(56) References Cited

U.S. PATENT DOCUMENTS

| 3,166,508 | A | | 1/1965 | Fields |
| 4,115,343 | A | * | 9/1978 | Guillaume ......... C10M 171/004 508/214 |
| 5,712,343 | A | * | 1/1998 | Geck ...................... A61K 8/068 106/287.14 |
| 5,766,513 | A | | 5/1998 | Pillon et al. |
| 7,662,757 | B2 | | 2/2010 | Poirier et al. |
| 7,700,527 | B2 | | 4/2010 | Fang et al. |
| 2013/0131254 | A1 | * | 5/2013 | Bloos ......................... C08J 3/02 524/505 |

OTHER PUBLICATIONS

R.W. Awe, "Silicone Antifoams for Lubricating Oils", Dow Corning Corp., National Fuels and Lubricants Meeting, Tulsa, Okla., Oct. 30-31, 1963, 5 pages.

* cited by examiner

*Primary Examiner* — Vu A Nguyen
(74) *Attorney, Agent, or Firm* — Phillips 66 Company

(57) ABSTRACT

A method comprising forming an antifoam solution comprising an antifoam and a base stock. The antifoam solution is sheared with a shear device to produce a sheared antifoam solution. The sheared antifoam solution has a maximum particle size less than about 1 micron.

4 Claims, 1 Drawing Sheet

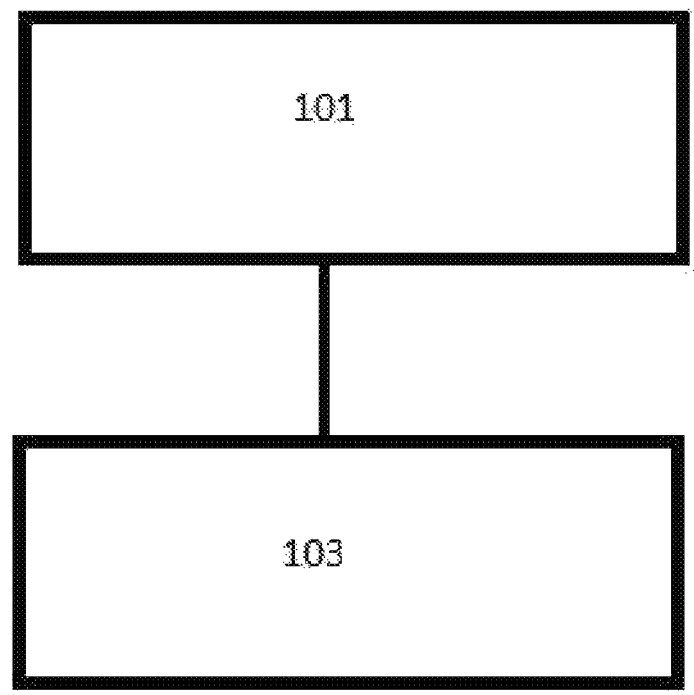

COMPOSITION FOR USE IN OILS

CROSS-REFERENCE TO RELATED APPLICATIONS

This application is a non-provisional application which claims the benefit of and priority to U.S. Provisional Application Ser. No. 62/213,730 filed Sep. 3, 2015, entitled "Composition for Use in Oils," which is hereby incorporated by reference in its entirety.

STATEMENT REGARDING FEDERALLY SPONSORED RESEARCH OR DEVELOPMENT

None.

FIELD OF THE INVENTION

This invention relates to a composition for use in oils.

BACKGROUND OF THE INVENTION

An antifoam agent is typically added to oils to reduce foaming and air entrainment. Antifoams are common additives in many types of lubricating oils and hydraulic fluids. The purpose of the antifoam is to retard the formation of stable foam on the surface of the oil in the sump, gearbox, or reservoir. Silicones or compounds containing silicone, and acrylic copolymers are popularly used in mineral-based lubricant formulations. Lighter grade turbine oils and hydraulic fluids are generally formulated with acrylate antifoam additives while heavier gear oils, paper machine oils, and crankcase lubricants may use silicone.

For the antifoam agents to be effective they need to have limited solubility in the lubricant in which they are added. As lubricating base stocks have become more highly refined the solubility has decreased to a point where it has been increasingly difficult to hold antifoams in suspension without the addition of a solubilizing agent.

There exists a need to increase the effectiveness of antifoam agents.

BRIEF SUMMARY OF THE DISCLOSURE

A method comprising forming an antifoam solution comprising an antifoam and a base stock. The antifoam solution is sheared with a shear device to produce a sheared antifoam solution. The sheared antifoam solution has a maximum particle size less than about 1 micron.

In an alternate embodiment a method is taught of forming an antifoam solution comprising from about 40 wt % to about 60 wt % antifoam and from about 40 wt % to about 60 wt % alkylated naphthalene base stock. This is followed by shearing the antifoam solution with a shear device to produce a sheared antifoam solution. In this embodiment the shear device comprise a shear mixer within a shear screen wherein the shear screen has a plurality of openings displaced throughout and the openings have at least four straight edges. Additionally, the sheared antifoam solution has a mean particle size from about 0.01 microns to about 0.025 microns and a maximum particle size of less than about 0.5 microns.

A composition comprising a sheared antifoam solution with a mean particle size from about 0.01 microns to about 0.5 microns and a maximum particle size of less than about 1 micron. In this composition the sheared antifoam solution comprises antifoam solution comprising an antifoam and a base stock.

In an alternate embodiment, the composition can also comprise an antifoam solution with a mean particle size from about 0.01 microns to about 0.025 microns and a maximum particle size of less than about 0.5 micron. In this embodiment the sheared antifoam solution is produced from: forming an antifoam solution comprising from about 40 wt % to about 60 wt % antifoam and from about 40 wt % to about 60 wt % alkylated naphthalene base stock; and shearing the antifoam solution with a shear device to produce a sheared antifoam solution. In this embodiment, the shear device can comprise a shear mixer within a shear screen wherein the shear screen has a plurality of openings displaced throughout and the openings have at least four straight edges.

BRIEF DESCRIPTION OF THE DRAWINGS

A more complete understanding of the present invention and benefits thereof may be acquired by referring to the follow description taken in conjunction with the accompanying drawings in which:

FIG. 1 depicts an embodiment of the present invention.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

As shown in FIG. 1, the method comprises 101 forming an antifoam solution comprising an antifoam and a base stock. It is then followed by 103 shearing the antifoam solution with a shear device to produce a sheared antifoam solution. In this embodiment the sheared antifoam solution has a maximum particle size of less than about 1 micron.

The method can also be used to create a composition comprising a sheared antifoam solution with a mean particle size from about 0.01 microns to about 0.5 microns and a maximum particle size of less than about 1 micron. In this composition the sheared antifoam solution comprises antifoam solution comprising an antifoam and a base stock.

In one embodiment the antifoam can be any conventionally known antifoam used to reduce foam in lubricating oils. Non-limiting examples of antifoams that can be used include: organo-modified siloxane, silicone, flurosilicone, polyacrylate or combinations thereof.

The amount of antifoam used in the antifoam solution can vary. In one embodiment the amount of antifoam can range from about 1 wt % to about 99 wt %. In other embodiments the range of antifoam can be from about 10 wt % to about 90 wt %, about 20 wt % to about 80 wt %, about 30 wt % to about 70 wt %, about 40 wt % to about 60 wt %, about 45 wt % to about 55 wt % or even from about 48 wt % to about 53 wt %.

In one embodiment the base stock can be any conventionally known base stock. Non-limiting examples of base stocks that can be used include: esters, polyalkylene glycols, alkylated naphthalenes, polyalphaolefins, petroleum mineral oils based on aromatic, naphthenic or paraffinic crude oils or combinations thereof.

The amount of base stock used in the antifoam solution can vary. In one embodiment the amount of base stock can range from about 1 wt % to about 99 wt %. In other embodiments the range of base stock can be from about 10 wt % to about 90 wt %, about 20 wt % to about 80 wt %, about 30 wt % to about 70 wt %, about 40 wt % to about 60 wt %, about 45 wt % to about 55 wt % or even from about 48 wt % to about 53 wt %.

In one embodiment it is possible that the antifoam solution only contains antifoam and base stock. In these examples it is possible that the antifoam solution does not contain a solubilizing agent. Solubilizing agents can be broadly defined as additional additives outside the core antifoam and base stock used to solubilize the antifoam or other additives into the base stock. Embodiments of the antifoam solution can either: consist of, consist essentially of or comprise of antifoam and base stock. It is envisioned that additional components added to the antifoam solution may reduce the effectiveness of the antifoam solution. Non-limiting examples of additional components that could be added to the antifoam solution include anti-wear additives, extreme pressure additives, detergents, dispersants, demulsifiers, friction modifiers, anti-oxidants, rust inhibitors, corrosion inhibitors or even pour point depressants.

After preparing the antifoam solution the antifoam solution can then be sheared with a shear device to produce a sheared antifoam solution. The shear device can consist of, consist essentially of or comprise of a shear mixer within a shear screen.

The shearing for the antifoam solution can be performed in a flow through system or a batch system.

The shear mixer used as part of the shear device can be any conventionally known shear mixer. In one embodiment the shear mixer is a high-shear mixer that disperses, or transports the antifoam into the base stock. Shear mixers or high-shear mixers typically have a rotor or impeller connected to a blade, together with a stationary component and situated either in a tank containing the antifoam solution to be mixed or in a pipe through which the antifoam solution passes. In other embodiments the shear mixer can also be envisioned to be an Eppenbach homo-mixer, a colloid mill, a Gaulin homogenizer, or a cowles high shear mixer blade.

Outside the shear device a shear screen can be used to increase shear within the antifoam solution. The shear screen can be of any size or shape as long as it is larger than the outer diameter of the rotor blade. The shear screen is typically disposed around the outside of the rotor blade to assist in the shearing of the antifoam solution.

The speed of the rotor blade can range from about 500 to about 30,000 rpm. The selection of the rotor blade speed can be adjusted to achieve maximum sheer effect on the antifoam solution.

A shear screen is typically circular in shape but in different embodiments different shapes are possible. Examples of different shapes that are possible include oblong, square, star, crescent, or even octagon shaped. The height of the shear screen can be any height feasible to achieve maximum shear effect while balancing the need for flow of the antifoam solution into the rotor blades.

The multiple perforations around the shear screen aid in the shearing of the antifoam solution. The perforations can be of any size and shape. In one embodiment the perforations can be circular, triangular, square, rectangular, star shaped or even crescent shaped. In an alternate embodiment the perforations can have at least two straight edges (such as a pizza slice shape), at least three straight edges (such as a triangle or three straight edges and a dome on top), or even at least four straight edges (such as a square).

In one embodiment the multiple perforations are not limited to only one type of perforation and could contain multiple types of perforations.

The sheared antifoam solution can have a mean particle size from about 0.01 microns to about 0.5 microns, or about 0.01 microns to about 0.25 microns, or about 0.01 microns to about 0.1 microns, or about 0.01 microns to about 0.05 microns, or about 0.01 microns to about 0.025 microns. The maximum particle size of the sheared antifoam solution can be less than 1.0 microns, less than 0.75 microns, less than 0.5 microns, less than 0.25 microns or even less than 0.1 microns.

It is theorized that the small mean particle size and a small maximum particle size will assist the antifoams to be held in suspension. Further it is theorized the current method and composition will reduce the antifoam effect on particle number determination and reduce the possibility of the antifoams being filtered out of solution.

The length of time required to achieve the desired particle size can vary from 5 minutes to 24 hours depending on the volume of starting material and the relative mean particle sizes of the starting materials.

The following examples of certain embodiments of the invention are given. Each example is provided by way of explanation of the invention, one of many embodiments of the invention, and the following examples should not be read to limit, or define, the scope of the invention.

The treat rate of this method and composition could vary between 0.001 percent by mass to 99.000 percent by mass. The required treat rate is a function of the final lubricating oil composition, performance requirements and end use application.

Example 1

A batch lab scale mixer was used with a duplex mixing assembly with a general purpose disintegrating head. A polyacrylate antifoam was mixed 50:50 with a base stock. The results are shown below:

TABLE 1

| | Base Stock | | | | | |
|---|---|---|---|---|---|---|
| | Alkylated Naphthalene | Alkylated Naphthalene | Paraffinic | Paraffinic | Naphthenic | Naphthenic |
| | | | Mixing Method | | | |
| | Duplex head | Prop | Duplex head | Prop | Duplex head | Prop |
| Minimum Size, Micron | 0.276 | 0.357 | 0.276 | 1.45 | 2.13 | 2.13 |

TABLE 1-continued

| | Base Stock | | | | | |
|---|---|---|---|---|---|---|
| | Alkylated Naphthalene | Alkylated Naphthalene | Paraffinic | Paraffinic | Naphthenic | Naphthenic |
| | | | Mixing Method | | | |
| | Duplex head | Prop | Duplex head | Prop | Duplex head | Prop |
| Maximum Size, Micron | 14.5 | 1.65 | 5.21 | 8.68 | 24.1 | 12.7 |
| Dn (10) micron | 0.335 | 0.477 | 0.364 | 2.06 | 2.85 | 2.61 |
| Dn (50) micron | 0.464 | 0.650 | 0.545 | 2.97 | 3.90 | 3.50 |
| Dn (90) micron | 0.686 | 0.965 | 1.04 | 4.74 | 5.82 | 5.17 |
| Solution Stability | Stable | Stable | Separates | Separates | Stable | Stable |

Example 2

A batch lab scale mixer was used with a shear screen. The shear screen used for this example did not have any straight edges and had perforations that were circular. A polyacrylate antifoam was mixed 50:50 with a alkylated naphthalene base stock. The results are shown below:

TABLE 2

| | Time (minutes) | | | | |
|---|---|---|---|---|---|
| | 0 | 2 | 5 | 10 | 10 |
| Minimum Size, Micron | 0.675 | 0.357 | 0.357 | 0.01 | 0.01 |
| Maximum Size, Micron | 21.1 | 24.1 | 14.5 | 0.243 | 0.276 |
| Dn (10) micron | 0.993 | 0.493 | 0.405 | 0.0114 | 0.0113 |
| Dn (50) micron | 1.32 | 0.708 | 0.592 | 0.0163 | 0.0161 |
| Dn (90) micron | 1.86 | 1.14 | 0.929 | 0.0322 | 0.0314 |

Example 3

A batch lab scale mixer was used with a shear screen. The shear screen used for this example had perforations with four straight edges. A polyacrylate antifoam was mixed 50:50 with a alkylated naphthalene base stock. The results are shown below:

TABLE 3

| | Time (minutes) | | | | |
|---|---|---|---|---|---|
| | 0 | 2 | 5 | 10 | 10 |
| Minimum Size, Micron | 0.675 | 0.405 | 0.0114 | 0.01 | 0.01 |
| Maximum Size, Micron | 21.1 | 27.4 | 0.594 | 0.276 | 0.243 |
| Dn (10) micron | 0.993 | 0.575 | 0.0138 | 0.0113 | 0.0128 |
| Dn (50) micron | 1.32 | 0.836 | 0.0184 | 0.0164 | 0.0192 |
| Dn (90) micron | 1.86 | 1.35 | 0.0346 | 0.0338 | 0.0402 |

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method comprising:
    forming an antifoam mixture comprising from about 40 wt % to about 60 wt % antifoam and from about 40 wt % to about 60 wt % alkylated naphthalene base stock; and shearing the antifoam mixture with a shear device to produce a sheared antifoam mixture,
    wherein the shear device comprise a shear mixer within a shear screen wherein the shear screen has a plurality of openings displaced throughout and the openings have at least four straight edges; and
    wherein the sheared antifoam mixture has a mean particle size from about 0.01 microns to about 0.025 microns and a maximum particle size of less than about 0.5 microns.

2. The method of claim 1, wherein the antifoam is selected from the group consisting of: organa-modified siloxane, silicone, flurosilicone, polyacrylate and combinations thereof.

3. The method of claim 1, wherein the antifoam mixture does not contain a solubilizing agent.

4. The method of claim 1, wherein the antifoam mixture is not heated prior to be sheared by the shear device.

* * * * *